United States Patent
Yang et al.

(10) Patent No.: US 9,799,879 B2
(45) Date of Patent: Oct. 24, 2017

(54) CATHODE MATERIAL OF LITHIUM-NICKEL-COBALT-ALUMINUM COMPOSITE OXIDE, A METHOD OF FABRICATING THE SAME AND A LITHIUM ION BATTERY INCLUDING THE SAME

(71) Applicant: Shenzhen BTR New Energy Materials Inc., Shenzhen (CN)

(72) Inventors: Shunyi Yang, Shenzhen (CN); Rusheng Fu, Shenzhen (CN); Youyuan Huang, Shenzhen (CN)

(73) Assignee: Shenzhen BTR New Energy Materials Inc., Shenzhen (CN)

( * ) Notice: Subject to any disclaimer, the term of this patent is extended or adjusted under 35 U.S.C. 154(b) by 319 days.

(21) Appl. No.: 14/585,754

(22) Filed: Dec. 30, 2014

(65) Prior Publication Data

US 2015/0194662 A1 Jul. 9, 2015

(30) Foreign Application Priority Data

Jan. 6, 2014 (CN) .......................... 2014 1 0004698

(51) Int. Cl.
*H01M 4/131* (2010.01)
*H01M 4/525* (2010.01)
*H01M 10/0525* (2010.01)

(52) U.S. Cl.
CPC .......... *H01M 4/131* (2013.01); *H01M 4/525* (2013.01); *H01M 10/0525* (2013.01)

(58) Field of Classification Search
CPC .. H01M 4/0471; H01M 4/131; H01M 4/1391; H01M 4/366; H01M 4/525; H01M 4/62
See application file for complete search history.

(56) References Cited

U.S. PATENT DOCUMENTS

| | | | |
|---|---|---|---|
| 9,293,761 B2 * | 3/2016 | Cho | H01M 4/364 |
| 2007/0202405 A1 * | 8/2007 | Shizuka | H01M 4/505 429/231.3 |
| 2012/0077083 A1 * | 3/2012 | Kageura | H01M 4/131 429/211 |
| 2013/0330616 A1 * | 12/2013 | Christensen | C01G 53/50 429/211 |
| 2014/0339464 A1 * | 11/2014 | Yue | H01M 4/525 252/182.1 |
| 2015/0016024 A1 * | 1/2015 | Choi | H01G 11/50 361/505 |

FOREIGN PATENT DOCUMENTS

| | | |
|---|---|---|
| CN | 1787254 A | 6/2006 |
| CN | 103337614 A | 10/2013 |
| JP | 2011187193 A | 9/2011 |
| KR | 20130077805 A | 7/2013 |

OTHER PUBLICATIONS

Machine translation of CN 103337614 A, published on Oct. 2, 2013.*

* cited by examiner

*Primary Examiner* — Anca Eoff
(74) *Attorney, Agent, or Firm* — Polster, Lieder, Woodruff & Lucchesi, LC (57) ABSTRACT

The present invention relates to a cathode material of Lithium-Nickel-Cobalt-Aluminum composite oxide, a method of fabricating the same, and a lithium ion battery including the same. The composite cathode material has a core-shell structure, wherein the core portion is made of $LiNi_{1-x-y}Co_xAl_yO_2$ which is washed with an alcohol and organic acid-mixed solution, wherein $0<x\le0.2$, $0<y\le0.1$; the shell is metal oxide layer. In the present invention, the composite cathode material is fabricated by a combined method, wherein the base material is washed with an alcohol and organic acid-mixed solution and the shell layer material is coated by spray drying. The composite cathode material of the present invention has low content of lithium impurities and excellent high-temperature cycling and storage performance.

18 Claims, 2 Drawing Sheets

CATHODE MATERIAL OF LITHIUM-NICKEL-COBALT-ALUMINUM COMPOSITE OXIDE, A METHOD OF FABRICATING THE SAME AND A LITHIUM ION BATTERY INCLUDING THE SAME

CROSS REFERENCE TO RELATED APPLICATIONS

This application claims priority to Chinese App. No. 201410004698.4 filed Jan. 6, 2014

TECHNICAL FIELD

The present invention relates to lithium ion battery technical field, especially, the lithium ion battery cathode material, particularly relates to a cathode material, a method fabricating the same and a lithium ion battery fabricated with the cathode material of Lithium-Nickel-Cobalt-Aluminum composite oxide.

BACKGROUND ART

Currently, $LiCoO_2$ is a conventional cathode material for high energy density lithium ion batteries. Under the limit of the compact density and the usage upper limit voltage, its energy density has reaches its maximum value and the battery is highly polarized under that energy density, so it's difficult to meet the requirements of high output power and long service life. Compared with $LiCoO_2$, layered lithium-nickel-cobalt-aluminum oxide cathode material $LiNi_{1-x-y}Co_xAl_yO_2$ (wherein $0<x\le0.2$, $0<y\le0.1$), because of its advantages on high specific discharge capacity (180~230 mAh/g) and low cost, are drawing increasingly attention in the field of lithium battery. It is expected to be one of cathode materials with the best market prospect in the future. However, the material itself still has some drawbacks to be solved:

(1) Poor processability. Due to difficulties in the oxidation of $Ni^{2+}$ to $Ni^{3+}$, generation of $Ni^{2+}$ is inevitable during the preparation process of $LiNi_{1-x-y}Co_xAl_yO_2$. In presence of $Ni^{2+}$ in $LiNi_{1-x-y}Co_xAl_yO_2$, some $Ni^{2+}$ takes the positions of $Ni^{3+}$, which consequently decreases cationic charge. To maintain the charge balance, some $Ni^{2+}$ take the positions of $Li^+$, leading to free $Li^+$ increase and reactive oxygen deintercalation inside structure. The reactive oxygen further react with $CO_2$ and $H_2O$ in the air to generate $CO_3^{2-}$ and $OH^-$. The generated $CO_3^{2-}$ and $OH^-$ continue to react with free active $Li^+$ to form impurities $Li_2CO_3$ and LiOH. Even at room temperature, there are $Li^+$ ions are deintercalated on the surface of the material to form $Li_2CO_3$. Formation lithium impurities ($Li_2CO_3$ and LiOH) result in elevated pH value and proportionally increased water content on the surface of the material, which lead to the poor dispersity and stability of the slurry. Thereby the preparation process of the slurry is difficult because it is easy to gel.

(2) Poor storage and cycling performance at high-temperature. On one hand, the electrolyte $LiPF_6$ can easily react with the water, which is brought in by the cathode material $LiNi_{1-x-y}Co_xAl_yO_2$, to generate HF during storage and cycling at high temperature. HF further reacts with $Li_2CO_3$ and LiOH impurities to produce $CO_2$ and $H_2O$ which serve as an initiator and further catalyze the decomposition of $LiPF_6$. On the other hand, during the charging process of $LiNi_{1-x-y}Co_xAl_yO_2$, $Ni^{2+}$ and $Ni^{3+}$ will gradually be transformed into oxidative and active $Ni^{4+}$, along with the deintercalation of the lithium ions. During the storage and cycling process at high temperature, the $Ni^{4+}$ can easily catalyze the decomposition of the solvent in the electrolyte system, which result in generation of a lot of $CO_2$ and influences the performance of the lithium ion battery with $LiNi_{1-x-y}Co_xAl_yO_2$ as the cathode material. For lithium ion battery with an aluminum-plastic composite film as outer package, because the outer package is soft, the generated gas will result in swelling and deformation of the lithium ion battery and bring severe safety hazard.

The Chinese patent CN102496710A discloses a nickel based multi-component cathode material coated with lithium phosphate and metal oxides and a method of fabricating the same. This invention utilizes the barrier effect of lithium phosphate and metal oxides and solves the problem of decomposition of the solvent in the electrolyte system by highly oxidative and active $Ni^{4+}$ at high temperature. However, as the coating of lithium phosphate and metal oxides are fabricated separately, it does not achieve the desired effect of reducing the amount of free lithium impurities on the surface of the material, which results in poor processability of the material. Meanwhile, due to presence of too much lithium impurities, the improvement on the thermal stability of the battery is limited.

The Chinese patent CN103337614A discloses a modification method of nickel based metal oxide cathode material $LiNi_xM_{1-x}O_2$, wherein the cathode material is washed with an alcohol and organic acid-mixed solution. This modification method removes the soluble impurities of the lithium salts on cathode material, significantly decreases the pH value of the material and partly improves the high-temperature storage and cycling performance of the battery. However, this method cannot solve the catalytic decomposition of the solvent in the electrolyte system by highly oxidative and active $Ni^{4+}$, and thus there still is comparatively much $CO_2$ production upon high-temperature storage and high-temperature cycling, which limits the performance of the battery and cannot meet the demands of current electric vehicles on power battery.

SUMMARY OF THE INVENTION

Addressing disadvantages of the prior art, the object of the invention is to provide a cathode material of Lithium-Nickel-Cobalt-Aluminum composite oxide, a method of fabricating the same and a lithium ion battery fabricated with this cathode material of Lithium-Nickel-Cobalt-Aluminum composite oxide. The cathode material of Lithium-Nickel-Cobalt-Aluminum composite oxide exhibits low impurity of lithium and excellent storage and cycling performance at high temperature.

The following technical solution is provided for achieving the object of the present invention:

The first aspect of the present invention is to provide a cathode material of Lithium-Nickel-Cobalt-Aluminum composite oxide for a lithium ion battery. The composite cathode material has a core-shell structure, wherein the core portion is $LiNi_{1-x-y}Co_xAl_yO_2$ which is washed and an alcohol and organic acid-mixed solution, wherein $0<x\le0.2$, $0<y\le0.1$; the shell portion is metal oxide layer.

The core materials of the cathode material of Lithium-Nickel-Cobalt-Aluminum composite oxide for a lithium ion battery of the present invention are washed with a mixed solution containing alcohols and organic acids thus containing significantly fewer impurities of lithium and lower pH values; the shell portion is a metal oxide layer coated by spray dry method. Spray drying method produces a more uniform coating layer compared with the traditional precipitation method. The shell is able to prevent the contact between active nickel ions and the electrolyte solution, decrease the gas production at high temperature and significantly improve the storage and cycling performance at high temperature.

The second aspect of the invention is to provide a method of fabricating the cathode material of Lithium-Nickel-Cobalt-Aluminum composite oxide according to the first aspect, which comprises the following steps:
(1) nickel-cobalt-aluminum composite and lithium source compounds are uniformly mixed and calcined to obtain the base material;
(2) the base materials are washed with a mixed solution of alcohols and organic acids to obtain the core material;
(3) the core material is added to a metal salt-containing solution to obtain a suspension which is then spray dried and annealed to obtain the core-shell structured cathode material of Lithium-Nickel-Cobalt-Aluminum composite oxide.

Preferably, the molar ratio by metal element of lithium source compounds and nickel-cobalt-aluminum composite in step (1) is (0.95~1.15):1.00, more preferably (1.00~1.10):1.00, particularly preferably (1.02~1.08):1.00. Typical but non-limiting ratios are: 0.955:1.00, 0.958:1.00, 0.96:1.00, 0.97:1.00, 1.00:1.00, 1.05:1.00, 1.10:1.00, 1.13:1.00, 1.142:1.00 or 1.148:1.00.

Preferably, in the mixing process, ball mill mixing, three-dimensional mixing or VC mixing is adopted, particularly three-dimensional mixing.

Preferably, the three-dimensional mixer is employed for the three-dimensional mixing.

Preferably, the frequency of the three-dimensional mixing is 10~100 Hz, more preferably 20~70 Hz, particularly preferably 20~50 Hz.

Preferably, the three-dimensional mixing lasts for at least 1 hour, more preferably 1.5~40 hours, particularly preferably 2~15 hours.

Preferably, calcination furnace is used for the calcination process.

Preferably, the calcination heating rate is less than 20° C./minute, more preferably 1~15° C./minute, particularly preferably 2~10° C./minute.

Preferably, the calcination temperature is 600~1000° C., such as 620° C., 640° C., 650° C., 800° C., 900° C., 920° C., 950° C. or 980° C., preferably 700~950° C., particularly preferably 750~850° C.; preferably, the calcination time lasts for at least 4 hours, such as 5 hours, 8 hours, 12 hours, 20 hours, 30 hours, 38 hours or 48 hours, more preferably 5~40 hours, particularly preferably 6~32 hours.

Preferably, the calcination process takes place in oxidizing atmosphere, more preferably in air and/or oxygen atmosphere.

Preferably, the volume flow rate of the oxidizing atmosphere is 2~150 mL/minute, more preferably 3~120 mL/minute, particularly preferably 5~100 mL/minute.

Preferably, the products are naturally cooled down to room temperature after calcination.

Preferably, the base materials are obtained by pulverization, classification and screening after calcination.

Preferably, the lithium source compound is one or a combination of at least two selected from the group consisting of lithium chloride, lithium bromide, lithium phosphate, dilithium hydrogen phosphate, lithium dihydrogen phosphate, lithium sulfate, lithium hydroxide, lithium acetate, lithium carbonate, lithium nitrate, lithium oxalate, lithium formate, lithium T-butoxide, lithium benzoate and lithium citrate; particularly preferably, one or a combination of at least two selected from the group consisting of lithium hydroxide, lithium acetate, lithium carbonate, lithium nitrate, lithium oxalate, lithium formate, lithium T-butoxide, lithium benzoate and lithium citrate. Typical but non-limiting examples are: lithium chloride and lithium bromide, lithium bromide and lithium phosphate, lithium phosphate and dilithium hydrogen phosphate, lithium dihydrogen phosphate and lithium sulfate, lithium sulfate and lithium hydroxide, lithium hydroxide and lithium acetate, lithium acetate and lithium carbonate, lithium carbonate and lithium nitrate, lithium nitrate and lithium oxalate, lithium formate and lithium T-butoxide, lithium T-butoxide and lithium benzoate, lithium benzoate and lithium citrate, lithium chloride, lithium bromide and lithium phosphate, lithium phosphate, dilithium hydrogen phosphate, lithium dihydrogen phosphate and lithium sulfate, lithium sulfate, lithium hydroxide, lithium acetate and lithium carbonate, etc.

Preferably, the nickel-cobalt-aluminum composite is one or a combination of at least two selected from the group consisting of nickel-cobalt-aluminum carbonate, nickel-cobalt-aluminum hydroxide and nickel-cobalt-aluminum oxide. Typical, but non-limiting examples are: nickel-cobalt-aluminum carbonate and nickel-cobalt-aluminum hydroxide, nickel-cobalt-aluminum hydroxide and nickel-cobalt-aluminum oxide, nickel-cobalt-aluminum carbonate and nickel-cobalt-aluminum oxide, nickel-cobalt-aluminum carbonate, nickel-cobalt-aluminum hydroxide and nickel-cobalt-aluminum oxide.

Preferably, the step (2) specifically includes: adding the base materials to the alcohol and organic acid-mixed solution and stirring to obtain a suspension; subjecting the suspension to centrifuging, alcohol washing and drying to obtain the core material.

Preferably, the mass ratio of the base materials to the alcohol and organic acid-mixed solution is (1~12):4, such as 1.2:4, 1.5:4, 2:4, 5:4, 8:4, 10:4, 11:4, 11.5:4, 11.8:4 or 11.9:4, more preferably (1~10):4, particularly preferably (1~8):4.

Preferably, the mass ratio of the organic acids to the alcohols in the mixed solution of the alcohol and organic acid is (1~38):19, such as 1.5:19, 2:19, 3:19, 8:19, 19:19, 25:19, 35:19 or 37:19, more preferably (1~25):19, particularly preferably (1~19):19.

Preferably, the rotational speed of mixing is 50~500 rpm, more preferably 80~450 rpm, particularly preferably 100~400 rpm.

Preferably, the mixing lasts for 5~300 minutes, more preferably 20~270 minutes, particularly preferably 30~240 minutes.

Preferably, the centrifugation speed is 1,000~10,000 rpm, more preferably 2,000~10,000 rpm, particularly preferably 3,000~10,000 rpm.

Preferably, the centrifugation time is less than 60 minutes, more preferably 5~40 minutes, particularly preferably 5~25 minutes.

Preferably, the alcohol used in the alcohol washing is $C_{1-6}$ alcohols, more preferably $C_{1-6}$ fatty alcohols, particularly preferably one or a combination of at least two selected from the group consisting of methanol, ethanol, isopropanol, glycerol, butanol, pentanol, N-hexanol, 2-methoxyethanol and 2-ethoxyethanol. The typical, but non-limiting examples include: methanol and ethanol, methanol and isopropanol, methanol and glycerol, ethanol and butanol, ethanol and glycerol, isopropanol and glycerol, glycerol and butanol, glycerol and pentanol, butanol and pentanol, N-hexanol and 2-methoxyethanol, 2-methoxyethanol and 2-ethoxyethanol, methanol, ethanol and isopropanol, ethanol, isopropanol, glycerol and butanol, pentanol, N-hexanol, 2-methoxyethanol and 2-ethoxyethanol.

Preferably, the number of times of washing is 2~8 times, particularly preferably 3~5 times.

Preferably, the vacuum furnace is employed for drying process, and the drying temperature is 80~200° C., more preferably 90~180° C., particularly preferably 100~150° C.

Preferably, the dried material is subjected to screening and classification to obtain the core material.

Preferably, the organic acids are carboxylic acids, more preferably $C_{1-8}$ carboxylic acids, particularly preferably one or a combination of at least two selected from the group of formic acid, acetic acid, propionic acid, propionic acid, valeric acid, N-hexanoic acid, butyric acid, trichloroacetic acid, trifluoroacetic acid and propionic acid. The typical, but non-limiting examples include: formic acid and acetic acid, formic acid and propionic acid, propionic acid and 2-propionic acid, valeric acid and N-hexanoic acid, N-hexanoic acid and butyric acid, butyric acid and trichloroacetic acid, trichloroacetic acid and trifluoroacetic acid, trifluoroacetic acid and propionic acid, formic acid, acetic acid and propionic acid, propionic acid, valeric acid and N-hexanoic acid.

Preferably, the alcohols are $C_{1-6}$ alcohols, more preferably $C_{1-6}$ fatty alcohols, particularly preferably one or a combination of at least two selected from the group consisting of methanol, ethanol, isopropanol, glycerol, butanol, pentanol, N-hexanol, 2-methoxyethanol and 2-ethoxyethanol. The typical, but non-limiting examples are: methanol and ethanol, methanol and isopropanol, methanol and glycerol, ethanol and butanol, ethanol and glycerol, isopropanol and glycerol, glycerol and butanol, glycerol and pentanol, butanol and pentanol, N-hexanol and 2-methoxyethanol, 2-methoxyethanol and 2-ethoxyethanol, methanol, ethanol and isopropanol, ethanol, isopropanol, glycerol and butanol, pentanol, N-hexanol, 2-methoxyethanol and 2-ethoxyethanol.

Preferably, the metal salts in step (3) account for 0.1~15% mass of the core material, such as 0.12%, 0.15%, 0.2%, 0.5%, 1%, 5%, 10%, 12%, 14%, 14.5%, 14.8% or 14.9%, more preferably 0.5% to 10%, particularly preferably 1% to 5%. Herein, the term "metal salts" refers to pure metal salt compounds.

Preferably, the metal salt is one or a combination of at least two selected from the group consisting of aluminum nitrate, magnesium nitrate, tetrabutyltitanate, zirconium nitrate, ammonium metavanadate, tetraethoxysilane, zinc acetate, copper nitrate, lanthanum nitrate, cerium nitrate and tin nitrate. The typical, but non-limiting examples are: aluminum nitrate and magnesium nitrate, magnesium nitrate and tetrabutyltitanate, tetrabutyltitanate and zirconium nitrate, magnesium nitrate and zirconium nitrate, zirconium nitrate and ammonium metavanadate, ammonium metavanadate and zinc acetate, zinc acetate, copper nitrate and lanthanum nitrate, copper nitrate, lanthanum nitrate, cerium nitrate and tin nitrate.

Preferably, the spray drying process is conducted with centrifugal spray drier, pressure spray drier or airflow spray drier, particularly preferably centrifugal spray drier.

Preferably, the feed rate of the spray-dried slurry is 10~100 mL/minute, such as 12 mL/minute, 15 mL/minute, 20 mL/minute, 40 mL/minute, 70 mL/minute, 90 mL/minute, 95 mL/minute or 98 mL/minute, more preferably 20~80 mL/minute, particularly preferably 30~60 mL/minute.

Preferably, the inlet temperature of the spray drier is 200~320° C., such as 210° C., 215° C., 250° C., 280° C., 300° C., 310° C., 315° C. or 318° C., more preferably 220~300° C., particularly preferably 240~280° C.

Preferably, the outlet temperature of the spray drier is 80~180° C., such as 82° C., 85° C., 90° C., 110° C., 140° C., 170° C., 175° C. or 178° C., more preferably 90~160° C., particularly preferably 100~150° C.

Preferably, the annealing temperature is 200~700° C., such as 210° C., 250° C., 300° C., 500° C., 600° C., 650° C., 680° C., 690° C. or 695° C., more preferably 250~600° C., particularly preferably 300~500° C.

Preferably, the annealing time is 1~50 hours, such as 2 hours, 5 hours, 10 hours, 20 hours, 25 hours, 30 hours, 40 hours, 45 hours, 48 hours or 49 hours, more preferably 3~30 hours, particularly preferably 5~20 hours.

In a preferred embodiment of the present invention, the fabricating method comprises:
(1') The nickel-cobalt-aluminum composite and lithium source compounds are uniformly mixed in the molar ratio by metal element of (0.95~1.15):1.00, calcined at 600~1,000° C. for at least 4 hours in an oxidizing atmosphere and after naturally cooled down to room temperature, subjected to pulverization, classification and screening to obtain the base material.
(2') the base materials are added to the alcohol and organic acid-mixed solution, with the mass ratio of the base materials and the alcohol and organic acid-mixed solution of (1~12):4, and stirred to obtain a suspension. The suspension is then subjected to centrifugation, 2~8 times of alcohol washing and drying to obtain the core material.
(3') the core material is added into the metal salt-containing solution, wherein the metal salts account for 0.1~15% of mass of the core material, to obtain the suspension which is then subjected to spray drying and annealing to obtain the core-shell structured cathode material of Lithium-Nickel-Cobalt-Aluminum composite oxide.

The third aspect of the present invention is to provide the cathode material of Lithium-Nickel-Cobalt-Aluminum composite oxide fabricated in the method according to any solution in the second aspect. The residual amount of $Li_2Co_3$ on the surface of the composite cathode material is ≤0.35% (wt %) and the residual amount of LiOH on the surface is ≤0.06% (wt %), pH is ≤11.35.

The fourth aspect of the present invention is to provide a lithium ion battery, wherein the lithium ion battery comprises the cathode material of Lithium-Nickel-Cobalt-Aluminum composite oxide fabricated in the method according to any solution in the first or third aspect.

Compared with the prior art, the beneficial effects of the present invention are: the present invention employs the combined process of washing the base material with an alcohol and organic acid-mixed solution and coating the shell material by spray drying. On one hand, the content of lithium impurities of the materials is significantly reduced and the materials' processing performance is excellent. On the other hand, the metal oxide coating layer with uniform surface could prevent the contact between active nickel ions and the electrolyte, which further decreases the gas production at high temperature and significantly improves the storage and cycling performance at high temperature. The residual amount of $Li_2Co_3$ on the surface of the core-shell structured cathode material of Lithium-Nickel-Cobalt-Aluminum composite oxide fabricated by the present invention is ≤0.35% (wt %), the residual amount of LiOH on the surface is ≤0.06% (wt %), pH is ≤11.35, and the slurry is not easy to gelate; the capacity retention rate of the final batteries is up to 84.5% after 500 cycles at 55° C. and energy retention rate is up to 98.1% after 30 days storage at 60° C.

DETAILED DESCRIPTION

The following describe further details of solutions of present invention with embodiments. The skilled persons in the present art shall understand that the following embodiments are merely the preferred embodiment of the present invention to facilitate better understanding of the present invention, but it should not be regarded as limitation for the scope of the present invention. For the persons skilled in the art, various modifications and alterations can be made to the present invention; any modification, equivalent replacement or improvement within the spirit and principle of the present invention, all fall within the protection scope of the present invention.

In the following embodiments and comparative examples, M refers to the molar quantities of the metal elements in the Lithium-Nickel-Cobalt-Aluminum composite. Li/M refers to the molar ratio of lithium element to the metal elements in the Lithium-Nickel-Cobalt-Aluminum composite.

Embodiment 1

The lithium carbonate and $Ni_{0.99}Co_{0.01}Al_{0.01}(OH)_2$ are added in a ratio of Li/M=1.05:1 into a three-dimensional mixer and mixed at a frequency of 30 Hz for 3 hours to obtain a homogeneous mixture; The mixture is placed in the atmosphere sintering furnace, heated to 750° C. with a heating rate of 3° C./min and kept for 10 hours. Oxygen is continuously infused at a rate of 20 mL/min during the calcination process. After calcination, it is naturally cooled down to room temperature, then subjected to pulverization, classification and screening to obtain the base material $LiNi_{0.99}Co_{0.01}Al_{0.01}O_2$. 1,000 g base material is slowly added into 1,000 g mixed solution (700 g methanol and 300 g acetic acid) and stirred continuously at a speed of 100 rpm for 120 minutes to obtain suspension. The suspension is placed in centrifugal machine and centrifuged at a speed of 6,000 rpm for 10 minutes. Then it is washed with methanol for 3 times. The materials after washing is transferred to a vacuum oven and dried at 120° C. to obtain the core materials. The core materials are then added to the aluminum nitrate solution to prepare the suspension (the weight of metal salts account for 2% weight of the dry powder). It is subjected to spray drying, with a feed rate of 60 mL/min, an inlet temperature of 280° C. and an outlet temperature of 100° C. The resulted materials is annealed for 5 hours at 400° C. to obtain the core-shell structured cathode material of Lithium-Nickel-Cobalt-Aluminum composite oxide for a lithium ion battery.

Embodiment 2

The lithium hydroxide and $Ni_{0.90}Co_{0.05}Al_{0.05}(OH)_2$ are added in a ratio of Li/M=1.08:1 into a three-dimensional mixer and mixed at a frequency of 20 Hz for 8 hours to obtain a homogeneous mixture. The mixture is placed in the atmosphere sintering furnace. With a heating rate of 2° C./minute, the temperature is raised to 800° C. and kept for 6 hours. Oxygen is continuously infused at a rate of 60 mL/minute during the calcination process. After calcination, it is naturally cooled down to room temperature, then subjected to pulverization, classification and screening to obtain the base material $LiNi_{0.90}Co_{0.05}Al_{0.05}O_2$. 1,000 g base material is slowly added into 500 g mixed solution (350 g ethanol and 150 g formic acid) and stirred continuously at a speed of 200 rpm for 30 minutes to obtain suspension. The suspension is placed in centrifugal machine and centrifuged at a speed of 7,000 rpm for 5 minutes. Then it is washed with ethanol for 5 times. The materials after washing is transferred to a vacuum oven and dried at 100° C. to obtain the core materials. The core materials are then added to the aluminum nitrate solution to prepare the suspension (the weight of metal salts account for 3% weight of the dry powder). It is subjected to spray drying, with a feed rate of 30 mL/minute, an inlet temperature of 260° C. and an outlet temperature of 110° C. The resulted materials is annealed for 8 hours at 400° C. to obtain the core-shell structured cathode material of Lithium-Nickel-Cobalt-Aluminum composite oxide for a lithium ion battery.

Embodiment 3

The lithium carbonate and $Ni_{0.08}Co_{0.15}Al_{0.05}(OH)_2$ are added in a ratio of Li/M=1.02:1 into a three-dimensional mixer and mixed at a frequency of 30 Hz for 10 hours to obtain a homogeneous mixture. The mixture is placed in the atmosphere sintering furnace. With a heating rate of 8° C./minute, the temperature is raised to 780° C. and kept for 20 hours. Oxygen is continuously infused at a rate of 5 mL/minute during the calcination process. After calcination, it is naturally cooled down to room temperature, then subjected to pulverization, classification and screening to obtain the base material $LiNi_{0.80}Co_{0.15}Al_{0.05}O_2$. 250 g base material is slowly added into 1,000 g mixed solution (800 g ethanol and 200 g propionic acid) and stirred continuously at a speed of 300 rpm for 180 minutes to obtain suspension. The suspension is placed in centrifugal machine and centrifuged at a speed of 8,000 rpm for 20 minutes. Then it is washed with ethanol for 4 times. The materials after washing is transferred to a vacuum oven and dried at 80° C. to obtain the core materials. The core materials are then added to the aluminum nitrate solution to prepare the suspension (the weight of metal salts account for 2% weight of the dry powder). It is subjected to spray drying, with a feed rate of 60 mL/minute, an inlet temperature of 280° C. and an outlet temperature of 130° C. The resulted materials is annealed for 20 hours at 400° C. to obtain the core-shell structured cathode material of Lithium-Nickel-Cobalt-Aluminum composite oxide for a lithium ion battery.

Embodiment 4

The lithium carbonate and $Ni_{0.7}Co_{0.2}Al_{0.1}(OH)_2$ are added in a ratio of Li/M=1.04:1 into a three-dimensional mixer and mixed at a frequency of 50 Hz for 2 hours to obtain a homogeneous mixture. The mixture is placed in the atmosphere sintering furnace. With a heating rate of 10°

C./minute, the temperature is raised to 820° C. and kept for 16 hours. Oxygen is continuously infused at a rate of 80 mL/minute during the calcination process. After calcination, it is naturally cooled down to room temperature, then subjected to pulverization, classification and screening to obtain the base material $LiNi_{0.7}Co_{0.2}Al_{0.1}O_2$. 800 g base material is slowly added into 1,000 g mixed solution (600 g methanol and 400 g formic acid) and stirred continuously at a speed of 80 rpm for 240 minutes to obtain suspension. The suspension is placed in centrifugal machine and centrifuged at a speed of 5,000 rpm for 15 minutes. Then it is washed with methanol for 3 times. The materials after washing is transferred to a vacuum oven and dried at 150° C. to obtain the core materials. The core materials are then added to the aluminum nitrate solution to prepare the suspension (the weight of metal salts account for 1.5% weight of the dry powder). It is subjected to spray drying, with a feed rate of 60 mL/minute, an inlet temperature of 280° C. and an outlet temperature of 100° C. The resulted materials is annealed for 10 hours at 400° C. to obtain the core-shell structured cathode material of Lithium-Nickel-Cobalt-Aluminum composite oxide for a lithium ion battery.

Embodiment 5

The lithium hydroxide and $Ni_{0.8}Co_{0.15}Al_{0.05}Co_3$ are added in a ratio of Li/M=1.05:1 into a three-dimensional mixer and mixed at a frequency of 30 Hz for 3 hours to obtain a homogeneous mixture. The mixture is placed in the atmosphere sintering furnace. With a heating rate of 3° C./minute, the temperature is raised to 750° C. and kept for 10 hours. Oxygen is continuously infused at a rate of 20 mL/minute during the calcination process. After calcination, it is naturally cooled down to room temperature, then subjected to pulverization, classification and screening to obtain the base material $LiNi_{0.80}Co_{0.15}Al_{0.05}O_2$. 1,000 g base material is slowly added into 1,000 g mixed solution (800 g ethanol and 200 g propionic acid) and stirred continuously at a speed of 100 rpm for 120 minutes to obtain suspension. The suspension is placed in centrifugal machine and centrifuged at a speed of 6,000 rpm for 10 minutes. Then it is washed with ethanol for 3 times. The materials after washing is transferred to a vacuum oven and dried at 80° C. to obtain the core materials. The core materials are then added to the zirconium nitrate solution to prepare the suspension (the weight of metal salts account for 2% weight of the dry powder). It is subjected to spray drying, with a feed rate of 60 mL/minute, an inlet temperature of 280° C. and an outlet temperature of 100° C. The resulted materials is annealed for 4 hours at 400° C. to obtain the core-shell structured cathode material of Lithium-Nickel-Cobalt-Aluminum composite oxide for a lithium ion battery.

Embodiment 6

The lithium nitrate and $Ni_{0.80}Co_{0.15}Al_{0.05}(OH)_2$ are added in a ratio of Li/M=1.05:1 into a three-dimensional mixer and mixed at a frequency of 30 Hz for 3 hours to obtain a homogeneous mixture. The mixture is placed in the atmosphere sintering furnace. With a heating rate of 3° C./minute, the temperature is raised to 750° C. and kept for 10 hours. Oxygen is continuously infused at a rate of 20 mL/minute during the calcination process. After calcination, it is naturally cooled down to room temperature, then subjected to pulverization, classification and screening to obtain the base material $LiNi_{0.80}Co_{0.15}Al_{0.05}O_2$. 1,000 g base material is slowly added into 1,000 g mixed solution (800 g ethanol and 200 g propionic acid) and stirred continuously at a speed of 100 rpm for 120 minutes to obtain suspension. The suspension is placed in centrifugal machine and centrifuged at a speed of 6,000 rpm for 10 minutes. Then it is washed with ethanol for 3 times. The materials after washing is transferred to a vacuum oven and dried at 80° C. to obtain the core materials. The core materials are then added to the magnesium nitrate solution to prepare the suspension (the weight of metal salts account for 2% weight of the dry powder). It is subjected to spray drying, with a feed rate of 60 mL/minute, an inlet temperature of 280° C. and an outlet temperature of 100° C. The resulted materials is annealed for 12 hours at 400° C. to obtain the core-shell structured cathode material of Lithium-Nickel-Cobalt-Aluminum composite oxide for a lithium ion battery.

Embodiment 7

The lithium acetate and $[Ni_{0.8}Co_{0.15}Al_{0.05}]O$ are added in a ratio of Li/M=1.06:1 into a three-dimensional mixer and mixed at a frequency of 40 Hz for 15 hours to obtain a homogeneous mixture. The mixture is placed in the atmosphere sintering furnace. With a heating rate of 3° C./minute, the temperature is raised to 800° C. and kept for 24 hours. Oxygen is continuously infused at a rate of 100 mL/minute during the calcination process. After calcination, it is naturally cooled down to room temperature, then subjected to pulverization, classification and screening to obtain the base material $LiNi_{0.80}Co_{0.15}Al_{0.05}O_2$. 1,000 g base material is slowly added into 1,000 g mixed solution (800 g ethanol and 200 g propionic acid) and stirred continuously at a speed of 450 rpm for 80 minutes to obtain suspension. The suspension is placed in centrifugal machine and centrifuged at a speed of 4,000 rpm for 20 minutes. Then it is washed with ethanol for 3 times. The materials after washing is transferred to a vacuum oven and dried at 120° C. to obtain the core materials. The core materials are then added to the tetraethyl orthosilicate solution to prepare the suspension (the weight of metal salts account for 4% weight of the dry powder). It is subjected to spray drying, with a feed rate of 50 mL/minute, an inlet temperature of 240° C. and an outlet temperature of 150° C. The resulted materials is annealed for hours at 500° C. to obtain the core-shell structured cathode material of Lithium-Nickel-Cobalt-Aluminum composite oxide for a lithium ion battery.

Embodiment 8

The lithium nitrate and $[Ni_{0.8}Co_{0.15}Al_{0.05}]_3O_4$ are added in a ratio of Li/M=1.05:1 into a three-dimensional mixer and mixed at a frequency of 30 Hz for 6 hours to obtain a homogeneous mixture. The mixture is placed in the atmosphere sintering furnace. With a heating rate of 7° C./minute, the temperature is raised to 850° C. and kept for 8 hours. Oxygen is continuously infused at a rate of 60 mL/minute during the calcination process. After calcination, it is naturally cooled down to room temperature, then subjected to pulverization, classification and screening to obtain the base material $LiNi_{0.80}Co_{0.15}Al_{0.05}O_2$. 1,000 g base material is slowly added into 1,000 g mixed solution (800 g ethanol and 200 g propionic acid) and stirred continuously at a speed of 200 rpm for 200 minutes to obtain suspension. The suspension is placed in centrifugal machine and centrifuged at a speed of 3,000 rpm for 25 minutes. Then it is washed with ethanol for 3 times. The materials after washing is transferred to a vacuum oven and dried at 100° C. to obtain the core materials. The core materials are then added to the tetrabutylorthotitanate solution to prepare the suspension (the weight of metal salts account for 1% weight of the dry powder). It is subjected to spray drying, with a feed rate of 40 mL/minute, an inlet temperature of 250° C. and an outlet temperature of 100° C. The resulted materials is annealed for 12 hours at 450° C. to obtain the core-shell structured cathode material of Lithium-Nickel-Cobalt-Aluminum composite oxide for a lithium ion battery.

Embodiment 9

The lithium hydroxide and $[Ni_{0.8}Co_{0.15}Al_{0.05}]_2O_3$ are added in a ratio of Li/M=1.06:1 into a three-dimensional mixer and mixed at a frequency of 30 Hz for 4 hours to obtain a homogeneous mixture. The mixture is placed in the atmosphere sintering furnace. With a heating rate of 3° C./minute, the temperature is raised to 750° C. and kept for 32 hours. Oxygen is continuously infused at a rate of 30 mL/minute during the calcination process. After calcination, it is naturally cooled down to room temperature, then subjected to pulverization, classification and screening to obtain the base material. 1,000 g base material is slowly added into 1,000 g mixed solution (800 g ethanol and 200 g propionic acid) and stirred continuously at a speed of 300 rpm for 120 minutes to obtain suspension. The suspension is placed in centrifugal machine and centrifuged at a speed of 7,000 rpm for 10 minutes. Then it is washed with ethanol for 3 times. The materials after washing is transferred to a vacuum oven and dried at 110° C. to obtain the core materials. The core materials are then added to the lanthanum nitrate solution to prepare the suspension (the weight of metal salts account for 5% weight of the dry powder). It is subjected to spray drying, with a feed rate of 50 mL/minute, an inlet temperature of 280° C. and an outlet temperature of 120° C. The resulted materials is annealed for 18 hours at 300° C. to obtain the core-shell structured cathode material of Lithium-Nickel-Cobalt-Aluminum composite oxide for a lithium ion battery.

The core materials are obtained by processing the cathode materials of $LiNi_{0.99}Co_{0.01}Al_{0.01}O_2$, $LiNi_{0.9}Co_{0.05}Al_{0.05}O_2$, $LiNi_{0.8}Co_{0.15}Al_{0.05}O_2$, $LiNi_{0.7}Co_{0.2}Al_{0.1}O_2$ according to the preparation method disclosed in Chinese patent CN103337614A. The comparative Examples of 1~4 are as follows:

Comparative Example 1

1,000 g base material $LiNi_{0.99}Co_{0.01}Al_{0.01}O_2$ in Embodiment 1 is slowly added into 1,000 g mixed solution (700 g methanol and 300 g acetic acid) and stirred continuously at a speed of 100 rpm for 120 minutes to obtain suspension. The suspension is placed in centrifugal machine and centrifuged at a speed of 6,000 rpm for 10 minutes. Then it is washed with methanol for 3 times. The materials after washing is transferred to a vacuum oven and dried at 120° C. to obtain the core materials.

Comparative Example 2

1,000 g base material $LiNi_{0.9}Co_{0.05}Al_{0.05}O_2$ in Embodiment 2 is slowly added into 500 g mixed solution (350 g ethanol and 150 g formic acid) and stirred continuously at a speed of 200 rpm for 30 minutes to obtain suspension. The suspension is placed in centrifugal machine and centrifuged at a speed of 7,000 rpm for 5 minutes. Then it is washed with ethanol for 5 times. The materials after washing is transferred to a vacuum oven and dried at 100° C. to obtain the core materials.

Comparative Example 3

250 g base material $LiNi_{0.8}Co_{0.15}Al_{0.05}O_2$ in Embodiment 3 is slowly added into 1,000 g mixed solution (800 g ethanol and 200 g propionic acid) and stirred continuously at a speed of 300 rpm for 180 minutes to obtain suspension. The suspension is placed in centrifugal machine and centrifuged at a speed of 8,000 rpm for 20 minutes. Then it is washed with ethanol for 4 times. The materials after washing is transferred to a vacuum oven and dried at 80° C. to obtain the core materials.

Comparative Example 4

800 g base material $LiNi_{0.7}Co_{0.2}Al_{0.1}O_2$ in Embodiment 4 is slowly added into 1,000 g mixed solution (600 g methanol and 400 g formic acid) and stirred continuously at a speed of 80 rpm for 240 minutes to obtain suspension. The suspension is placed in centrifugal machine and centrifuged at a speed of 5,000 rpm for 15 minutes. Then it is washed with methanol for 3 times. The materials after washing is transferred to a vacuum oven and dried at 150° C. to obtain the core materials.

The base materials $LiNi_{0.99}Co_{0.01}Al_{0.01}O_2$, $LiNi_{0.9}Co_{0.05}Al_{0.05}O_2$, $LiNi_{0.8}Co_{0.15}Al_{0.05}O_2$, $LiNi_{0.7}Co_{0.2}Al_{0.1}O_2$, which are not treated with the alcohol and organic acid-mixed solution, are directly coated with the oxides by spray drying to get the cathode materials. The Comparative Examples of 5~8 are as follows:

Comparative Example 5

The base material $LiNi_{0.99}Co_{0.01}Al_{0.01}O_2$ in Embodiment 1 is added to the aluminum nitrate solution to prepare the suspension (the weight of metal salts account for 2% weight of the dry powder). It is subjected to spray drying, with the feed rate of 60 mL/minute, an inlet temperature at 280° C. and an outlet temperature at 100° C. The resulted materials is annealed for 5 hours at 400° C. to obtain the core-shell structured cathode material of Lithium-Nickel-Cobalt-Aluminum composite oxide for a lithium ion battery.

Comparative Example 6

The base material $LiNi_{0.9}Co_{0.05}Al_{0.05}O_2$ in Embodiment 2 is added to the aluminum nitrate solution to prepare the suspension (the weight of metal salts account for 3% weight of the dry powder). It is subjected to spray drying, with the feed rate of 30 mL/minute, an inlet temperature at 260° C. and an outlet temperature at 110° C. The resulted materials is annealed for 8 hours at 400° C. to obtain the core-shell structured cathode material of Lithium-Nickel-Cobalt-Aluminum composite oxide for a lithium ion battery.

Comparative Example 7

The base material $LiNi_{0.8}Co_{0.15}Al_{0.05}O_2$ in Embodiment 3 is added to the aluminum nitrate solution to prepare the suspension (the weight of metal salts account for 2% weight of the dry powder). It is subjected to spray drying, with the feed rate of 60 mL/minute, an inlet temperature at 280° C. and an outlet temperature at 130° C. The resulted materials is annealed for 20 hours at 400° C. to obtain the core-shell structured cathode material of Lithium-Nickel-Cobalt-Aluminum composite oxide for a lithium ion battery.

Comparative Example 8

The base material $LiNi_{0.7}Co_{0.2}Al_{0.1}O_2$ in Embodiment 4 is added to the aluminum nitrate solution to prepare the suspension (the weight of metal salts account for 1.5% weight of the dry powder). It is subjected to spray drying, with the feed rate of 60 mL/minute, an inlet temperature at 280° C. and an outlet temperature at 100° C. The resulted materials is annealed for 10 hours at 400° C. to obtain the core-shell structured cathode material of Lithium-Nickel-Cobalt-Aluminum composite oxide for a lithium ion battery.

Comparative Example 9

The base material $LiNi_{0.99}Co_{0.01}Al_{0.01}O_2$ fabricated in Embodiment 1.

Comparative Example 10

The base material $LiNi_{0.9}Co_{0.05}Al_{0.05}O_2$ fabricated in Embodiment 2.

Comparative Example 11

The base material $LiNi_{0.8}Co_{0.15}Al_{0.05}O_2$ fabricated in Embodiment 3.

Comparative Example 12

The base material $LiNi_{0.7}Co_{0.2}Al_{0.1}O_2$ fabricated in Embodiment 4.

Figure 1:
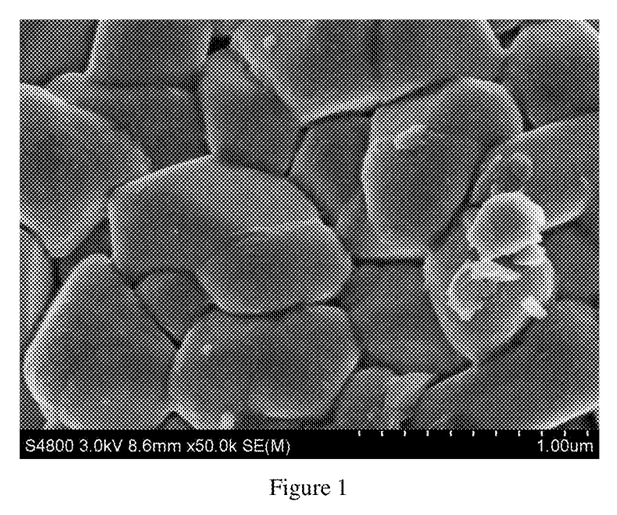
FIG. 1 shows the micrographs of scanning electron microscopy (SEM) of the base material in Comparative Example 11 of the present invention.
Figure 2:
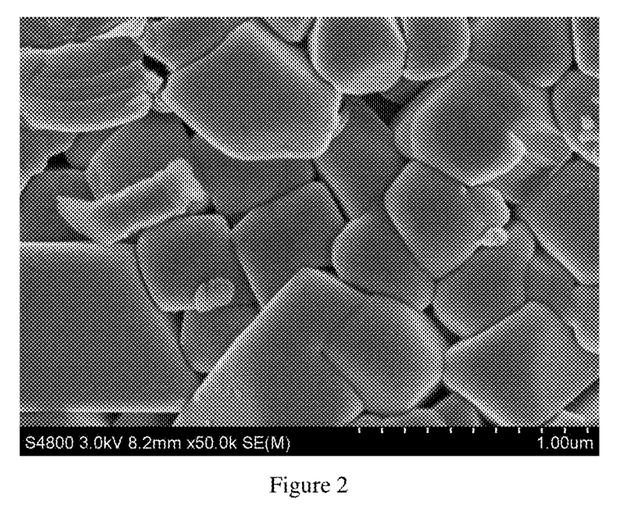
FIG. 2 shows the micrographs of scanning electron microscopy (SEM) of the core material after washing treatment in Comparative Example 3 of the present invention.
Figure 3:
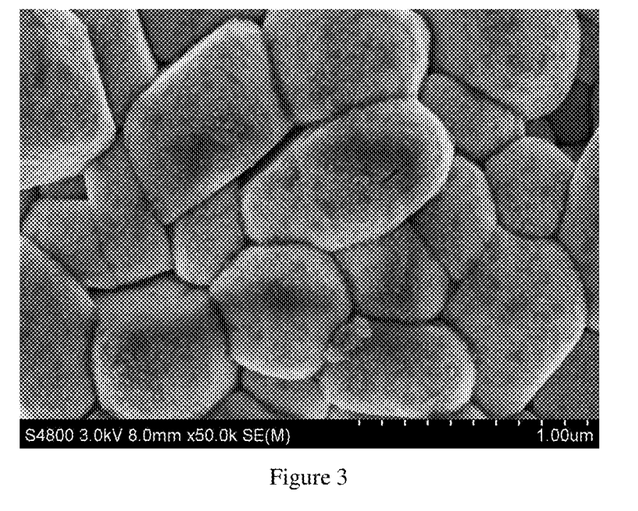
FIG. 3 shows the micrographs of scanning electron microscopy (SEM) of the core-shell structured cathode material of Lithium-Nickel-Cobalt-Aluminum composite oxide in Embodiment 3 of the present invention.

The morphology of the materials fabricated in Comparative Example 11, Comparative Example 3 and Embodiment 3 are observed using a Japanese Hitachi S-4800 field-emission scanning electron microscope and the results are shown in FIG. 1, FIG. 2 and FIG. 3, respectively.

Shown by the comparison of FIG. 1, FIG. 2 and FIG. 3, the surface of the base materials is relatively rough while that of the core materials becomes smooth, which indicates that impurities on the surface of the materials have been removed after washing treatment. There is a uniform nano-layer on the surface of the final products, which indicates that the oxides have been successfully coated on the surface of the core materials and the core-shell structured composite materials are formed.

The cathode materials fabricated according to Embodiments 1~9 and Comparative Examples 1~12 are tested using the methods below.

Measurement of impurities of $Li_2Co_3$ and LiOH on the surface: the impurity content of $Li_2Co_3$ and LiOH of the cathode materials is titrated with the hydrochloric acid standard solution and calculated through the consumption of hydrochloric acid by volume.

Measurement of the pH value: 5 g cathode material is weighed, placed into 45 mL double-distilled water with carbon dioxide removal, and thoroughly stirred or ultrasonicated. After standing, the supernatant is collected and measured with pH meter (Mettler Toledo) for its pH value.

The cathode materials of Embodiments 1~9 and Comparative Examples 1~12 are individually assembled as the 7090130P soft pack batteries using the methods below:

Preparation of a cathode plate: cathode material, adhesive PVDF and conductive agent Super-P are subjected cathode formulation in a ratio of 97:1:2 under oil and vacuum conditions in a 5 L mixer to obtain uniform cathode slurry. The prepared cathode slurry is uniformly coated on the aluminum foil of a cathode current collector to obtain a cathode plate.

Preparation of an anode plate: graphite, thickener carboxymethyl cellulose (CMC), adhesive styrene-butadiene rubber (SBR) and conductive agent Super-P are subjected anode formulation in a mass ratio of 95:1:2:2 under water conditions to obtain uniform anode slurry. The prepared anode slurry is uniformly coated on the copper foil of an anode current collector and cooled down to obtain an anode plate.

Preparation of the lithium ion battery: the cathode plate, the anode plate and the membrane are coiled to form the lithium-ion battery core; non-aqueous electrolyte solution is injected to fabricate 7090130P soft pack batteries; $LiPF_6$ with a concentration of 1.0 mol/L is adopted as the electrolyte and the mixture of ethylene carbonate and diethyl carbonate in a volume ratio of 1:1 as the non-aqueous solvent.

Gelation performance test of the cathode material slurry of the Embodiments 1~9 and Comparative Examples 1~12: under the 80% humidity and 25° C. temperature, the fabricated cathode material slurry is put into a sealed container in which there is a beaker with water, in order to create a humid atmosphere and examine the gelation performance of the materials. Experimental record is made every hour to record the gelation status of the slurry.

The electrical properties of the lithium ion batteries fabricated in the Embodiments and Comparative Examples above are tested using the methods below:

Charge and discharge test: formation of the lithium battery is firstly performed. Lithium ion battery is sequentially charged as below: firstly to 3.4 V with a constant current of 0.01 C at 45° C., secondly to 3.8 V with a constant current of 0.2 C, thirdly to 4.2 V with a constant current of 0.2 C at 55° C. and lastly to 0.05 C with constant voltage. After standing for 5 min, lithium ion battery is discharged to 3 V at 0.2 C. The discharge capacity and the discharge capacity after 500 cycles are recorded.

High temperature storage performance test at 60° C. for 30 days: the initial discharge capacity of the battery is tested with a current of 1.0 C at room temperature. Then the battery is charged to 4.2 V with a constant current of 1.0 C; after then, charge with a constant voltage until the current falls to 0.05 C. The charging process is stopped and the battery is standing for 1 hour. After the thickness of the battery is measured, the battery is put into a high-temperature chamber at 60° C.±2° C. for 30 days. After the storage, the thickness of the battery is measured again inside the high temperature chamber and the thickness swelling rate is obtained by comparison with the initial thickness. Then the battery is taken out and staying at room temperature for 1 hour. The remaining capacity is measured with a constant current of 1.0 C. The capacity retention rate is obtained by dividing the remaining capacity by the initial discharge capacity.

The physical and chemical properties of the cathode materials and the performance test results of the lithium ion batteries of the Embodiments 1~9 and Comparative Examples 1~12 of the present invention, are shown in table 1.

TABLE 1

| Embodiments | content Of $Li_2CO_3$ (wt %) | Content of LiOH (wt %) | pH value | Gelation | Capacity retention rate after 500 cycles at 55° C. (%) | 60° C., 30 days Thickness swelling rate (%) | 60° C., 30 days Capacity retention rate (%) |
|---|---|---|---|---|---|---|---|
| Embodiment 1 | 0.350 | 0.060 | 11.35 | No gelation after 48 h | 70.3 | 13.2 | 92.2 |
| Comparative example 1 | 0.357 | 0.125 | 11.47 | Gelation after 24 h | 52.8 | 24.9 | 87.8 |
| Comparative example 5 | 0.656 | 0.275 | 12.12 | Gelation after 12 h | 43.7 | 28.1 | 86.8 |
| Comparative example 9 | 0.902 | 0.523 | 12.85 | Gelation after 1 h | 25.7 | 50.7 | 75.7 |
| Embodiment 2 | 0.236 | 0.054 | 11.29 | No gelation after 72 h | 77.9 | 11.7 | 93.7 |
| Comparative example 2 | 0.325 | 0.125 | 11.48 | Gelation after 21 h | 60.7 | 24.7 | 85.5 |
| Comparative example 6 | 0.536 | 0.308 | 12.05 | Gelation after 12 h | 55.2 | 24.8 | 82.4 |
| Comparative example 10 | 0.862 | 0.511 | 12.71 | Gelation after 3 h | 35.2 | 40.4 | 79.3 |
| Embodiment 3 | 0.221 | 0.045 | 11.12 | No gelation after 108 h | 81.7 | 6.5 | 97.5 |
| Comparative example 3 | 0.243 | 0.111 | 11.32 | Gelation after 60 h | 60.2 | 12.2 | 93.5 |
| Comparative example 7 | 0.479 | 0.285 | 11.97 | Gelation after 12 h | 55.6 | 17.3 | 93.0 |
| Comparative example 11 | 0.723 | 0.537 | 12.66 | Gelation after 3 h | 42.7 | 35.6 | 88.8 |
| Embodiment 4 | 0.158 | 0.028 | 11.02 | No gelation after 120 h | 83.2 | 6.2 | 97.2 |
| Comparative example 4 | 0.198 | 0.096 | 11.09 | Gelation after 72 h | 72.9 | 15.5 | 92.8 |
| Comparative example 8 | 0.325 | 0.101 | 11.67 | Gelation after 21 h | 65.3 | 16.5 | 92.1 |
| Comparative example 12 | 0.522 | 0.104 | 12.19 | Gelation after 10 h | 52.1 | 30.7 | 87.4 |
| Embodiment 5 | 0.205 | 0.037 | 11.08 | No gelation after 108 h | 82.1 | 5.7 | 97.2 |
| Embodiment 6 | 0.196 | 0.035 | 11.02 | No gelation after 108 h | 84.5 | 5.5 | 98.1 |
| Embodiment 7 | 0.212 | 0.045 | 11.17 | No gelation after 108 h | 79.2 | 6.5 | 96.5 |
| Embodiment 8 | 0.217 | 0.049 | 11.22 | No gelation after 108 h | 78.5 | 7.8 | 97.2 |
| Embodiment 9 | 0.205 | 0.038 | 11.08 | No gelation after 108 h | 83.2 | 6.2 | 97.0 |

As illustrated by the table 1, when the materials fabricated in the method of the present invention is adopted, the content of $Li_2Co_3$ and LiOH on the surface of the material is low, the gelation phenomenon is not easy to occur during the slurry preparation, the capacity retention rate at high temperature 55° C. after 500 cycles is relatively high, thickness swelling rate at high temperature is relatively low and capacity retention rate is high.

The above illustrate that the cathode material of lithium ion battery fabricated by the present invention exhibit good processing performance and excellent storage and cycling performance at high temperature.

The applicant stated that the present invention employ the embodiments above to describe the detailed feature and method of the present invention, but the present invention is not limited to the detailed feature and method above, i.e. it does not mean that the present invention must rely on the detailed feature and method above to be implemented. Persons skilled in the art should understand, any improvement of the present invention, the equivalent replacement to the raw materials of the present invention, adding auxiliary ingredients, specific mode selection, etc. all fall within the protection scope and disclosure scope of the present invention.

The invention claimed is:

1. A method of fabricating a Cathode material of Lithium-Nickel-Cobalt-Aluminum composite oxide for lithium ion batteries, comprising of the following steps:
   (1) a nickel-cobalt-aluminum composite and a lithium source compound are uniformly mixed and calcined to obtain a base material;
   (2) the base material is washed with an alcohol and organic acid-mixed solution to obtain a core material;
   (3) the core material is added to a metal salt solution to form a suspension which is then spray dried and annealed to obtain a core-shell structured Cathode material of Lithium-Nickel-Cobalt-Aluminum composite oxide; wherein the core is made of $LiNi_{0.7-0.8}Co_{0.15-0.2}Al_{0.05-0.1}O_2$ and the shell comprises metal oxide layer.

2. The method according to claim 1, wherein in the step (1), the molar ratio of lithium source compounds to nickel-cobalt-aluminum composite based on metal element is $(0.95~1.15):1.00$.

3. The method according to claim 1, wherein in the step (1), ball-mill mixing or three-dimensional mixing is adopted.

4. The method according to claim 3, wherein the mixing is done by three-dimensional mixing with a frequency of 10~100 Hz and a duration of at least 1 hour.

5. The method according to claim 1, wherein in the step (1), the calcination has a heating rate of less than 20° C./minute and has a temperature of 600~1000° C. and the calcination time lasts for at least 4 hours.

6. The method according to claim 1, wherein in the step (1), the calcination takes place in an oxidizing atmosphere.

7. The method according to claim 6, the volume flow rate of the oxidizing atmosphere is 2~150 mL/minute and the base material is obtained by pulverization, classification and screening after calcination.

8. The method according to claim 1, wherein the lithium source compound is one or a combination of at least two selected from the group consisting of lithium chloride, lithium bromide, lithium phosphate, dilithium hydrogen phosphate, lithium dihydrogen phosphate, lithium sulfate, lithium hydroxide, lithium acetate, lithium carbonate, lithium nitrate, lithium oxalate, lithium formate, lithium T-butoxide, lithium benzoate and lithium citrate.

9. The method according to claim 1, wherein the nickel-cobalt-aluminum composite is one or a combination of at least two selected from the group consisting of nickel-cobalt-aluminum carbonate, nickel-cobalt-aluminum hydroxide and nickel-cobalt-aluminum oxide.

10. The method according to claim 1, wherein the step (2) specifically comprises: adding the base material to the alcohol and organic acid-mixed solution and stirring to obtain a suspension; subjecting the suspension to centrifugation, washing with alcohol and drying to obtain the core material.

11. The method according to claim 10, wherein the mass ratio of the base material to the alcohol and organic acid-mixed solution is (1~12):4.

12. The method according to claim 10, wherein the mass ratio of the organic acid to the alcohol in the alcohol and organic acid-mixed solution is (1~38):19.

13. The method according to claim 10, wherein the organic acid is a $C_{1-8}$ carboxylic acid and the alcohol is a $C_{1-6}$ alcohol.

14. The method according to claim 1, wherein in the step (3), the metal salt account for 0.1~15% of the mass of the core material; and the metal salt is one or a combination of at least two selected from the group consisting of aluminum nitrate, magnesium nitrate, zirconium nitrate, ammonium metavanadate, zinc acetate, copper nitrate, lanthanum nitrate, cerium nitrate and tin nitrate.

15. The method according to claim 1, wherein in the step (3), the annealing has a temperature of 200~700° C.

16. The method according to claim 1, comprising:
(1') the nickel-cobalt-aluminum composite and the lithium source compound are uniformly mixed in the molar ratio of (0.95~1.15):1.00 based on metal elements, calcined at 600~1,000° C. for at least 4 hours in an oxidizing atmosphere, naturally cooled down to room temperature, and then subjected to pulverization, classification and screening to obtain the base material;
(2') the base material is added to the alcohol and organic acid-mixed solution, wherein the mass ratio of the base materials to the alcohol and organic acid-mixed solution is (1~12):4, and is stirred to obtain a suspension; the suspension is then subjected to centrifugation, alcohol washing 2~8 times and drying to obtain the core material;
(3') the core material is added into the metal salt solution, wherein the metal salt account for 0.1~15% of the mass of the core material, to obtain a suspension; the suspension is subjected to spray drying and annealing to obtain the core-shell structured Cathode material of Lithium-Nickel-Cobalt-Aluminum composite oxide.

17. The method of claim 1 wherein a slurry of the cathode material takes longer than 100 hours to gelate at 80% humidity and 25° C.

18. The method according to claim 8, wherein the lithium source compound is one or a combination of at least two selected from the group consisting of lithium hydroxide, lithium acetate, lithium carbonate, lithium nitrate, lithium oxalate, lithium formate, lithium T-butoxide, lithium benzoate and lithium citrate.

\* \* \* \* \*